United States Patent [19]

Lazovsky et al.

[11] 4,152,266

[45] May 1, 1979

[54] FILTER FOR TREATMENT OF NATURAL AND WASTE WATER

[75] Inventors: Yakov B. Lazovsky; Mark G. Novikov, both of Leningrad, U.S.S.R.

[73] Assignee: Leningradsky Nauchno-Issledovalelsky Institut Akademii Kommunnogo Khozualstua Imeni Pamfilova, U.S.S.R.

[21] Appl. No.: 791,154

[22] Filed: Apr. 26, 1977

[51] Int. Cl.² .............................................. B01D 23/10
[52] U.S. Cl. ..................................... 210/279; 210/291
[58] Field of Search ............... 210/275, 289, 291, 293, 210/80, 82, 279

[56] References Cited

U.S. PATENT DOCUMENTS

| | | | |
|---|---|---|---|
| 1,903,613 | 4/1933 | Dotterweich | 210/293 |
| 2,244,188 | 6/1941 | Danner | 210/279 |
| 2,296,824 | 9/1942 | Ashworth | 210/80 |
| 3,110,667 | 11/1963 | Stuppy | 210/293 |
| 3,925,202 | 12/1975 | Hirs | 210/293 |
| 3,956,134 | 5/1976 | Sturgill | 210/293 |
| 3,984,326 | 10/1976 | Bendel | 210/275 |

Primary Examiner—Charles N. Hart
Assistant Examiner—Ivars Cintins
Attorney, Agent, or Firm—Steinberg & Blake

[57] ABSTRACT

The filter for treatment of natural and waste water comprises a housing accommodating a body of a granular filtering material. Disposed above the filtering body is a system of troughs communicating with a collecting-distributing duct. Disposed in the lowermost bed of the filtering body is a draining-distributing system communicating with the charging or delivery duct. The charging duct is provided with a device for positive distribution of water over the length thereof.

6 Claims, 5 Drawing Figures

FILTER FOR TREATMENT OF NATURAL AND WASTE WATER

The invention relates to the art of treatment of natural and waste water.

There are widely known filters for water treatment including a housing accommodating therein a body of a granular filtering material, with a sand upper bed and a gravel lower bed, and with the granulometry of the filtering body gradually decreasing in the upward direction. The lowermost bed of the filtering body accommodates a draining-distributing system communicating with a charging or delivery duct, while above the filtering body there is accommodated within the housing a system of troughs communicating with a collecting-distributing duct.

In the process of the filtering operation with the use of the aforementioned known filters, treatment of water is effected by making the water pass through the filtering body. Depending on the actual direction of the flow of the water being treated, the filtering is performed either in the upward direction (i.e. ascending filtration) or in the downward direction (descending filtration).

Notwithstanding the direction of the flow of the water being treated in the process of the filtering operation, washing or flushing of the filtering body is effected by suspending the grains of the charge in an upward flow of water, in which case the water is directed into the filtering body from the draining-distributing system, while the washed-away dirt and impurities are collected by the system of the troughs into the collecting-distributing duct wherefrom they are directed into a sewage system.

The said known filters differ from one another in their structural features associated with the supply of the washing water into the filtering body, so that the delivery or charging duct is arranged now at the central portion of the filter, then under the bottom thereof, then again outside the filter altogether.

However, the hitherto known filters are characterized by inadequately uniform distribution of the washing water over the surface area of the filtering body, whereby the lower gravel beds display a tendency to get displaced and mixed over the service life of the filter. Consequently, unwashable areas are formed in the filtering body, which cannot but affect the operational and economic characteristics of the performance of the filter.

Thus, among the filters of the prior art there is a water treatment filter including a housing accommodating therein a granular filtering body with the gravel lower beds, the granulometry of this body gradually decreasing in the upward direction. The main draining-distributing system is arranged under the filtering body and includes an upwardly flaring tube with a screen tensioned thereacross. This draining-distributing system is intended to collect the water treated by the filtering body and to distribute the water charged for washing the filtering body. To step up the filter-washing efficiency, an additional distributing system is arranged above the filtering body, of which the practically sole function is loosening the upper bed of this body at washing. Arranged above the additional distributing system is a system of troughs communicating with the collecting-distributing duct, intended to recover the treated water in the filtering mode of operation and to collect the washing water in the washing mode.

Among the disadvantages of this known filter is the absence of adequate uniformity of distribution of the washing water over the entire surface area of the filtering body by the main drainage-distributing or discharge system, to say nothing of the rather complicated structure of the filter, as a whole, caused by the incorporation of the additional distributing system. As a result of inadequately uniform washing, some dirt and impurities are liable to remain in the filtering body, accummulating from one washing cycle to the next one.

There is also known a water treatment filter wherein, unlike the abovediscussed filter, the draining-distributing system is in a grate- or screen-like form and communicates with the charging duct arranged thereunder.

As compared with the abovediscussed structure of the filter of the prior art, the presently discussed filter enables to step up to a certain degree the efficiency of a washing operation, owing to the greater uniformity of the distribution of the washing water; it further enables to do away with the additional distributing system.

However, the structure of even this filter does not preclude the formation of unwashable zones in the filtering body; neither is it a guarantee against some filtering material falling through the grate- or screen-like draining-distributing system into the charging duct at washing.

There is still another known structure of a water treatment filter differing from those described above in that its draining-distributing system is made up of perforated tubes and communicates with the charging duct arranged beyond the confines of the filter housing. The bottom of the housing of the filter has made therein longitudinal cavities of a curvilinear cross-section, each such cavity accommodating the respective one of the perforated tubes of the draining-distributing system. In order to preclude the access of the loosened grains of the filtering body into the perforated tubes, the perforations in the latter are additionally protected with a safety mesh made of a corrosion-resistant material. The said safety mesh enable to rid the filter of the gravel beds in the filtering body, while the arrangement of the draining-distributing system in the cavities of the bottom of the housing steps up the efficiency of washing the filtering body to remove the polluting matter therefrom.

However, the structure of this last-described filter involves the complicated process of manufacturing the bottom of the housing; the structure would not positively preclude formation of unwashable zones in the filtering body, on account of inadequately uniform distribution of the washing water from the charging duct into the tubes of the draining-distributing system.

The filter of the prior art which is the closest to the one disclosed in the present specification is a water treatment filter wherein, unlike the filters discussed above, the washing water is supplied into the charging duct through an opening in one of the walls of the duct, the introduction of the washing water into the charging duct being effected in a direction either parallel with or perpendicular to the tubes of the draining-distributing system, depending on their arrangement with respect of the washing water conduit.

With the bottom of the last-discussed filter being horizontal and plane, the structure of the filter is simplified, while the presence of the tubular draining-distributing system of a high flow resistance is a guarantee of a relatively high degree of washing the filtering body from the polluting matter, as the filtering body is suspended in the ascending flow of the washing water.

Among the disadvantages of this last-described filter, however, is the non-uniformity of admission of the washing water into the tubes of the draining-distributing system, on account of the formation of a low-pressure zone in the inlet portion of the charging duct (when the latter is disposed within the filter housing), or else on account of the formation of a higher-pressure zone in the inlet portion of the charging duct (when the latter is arranged outside the filter housing).

An outcome of these phenomena is the fact that the degree of non-uniformity of the supply of the washing water into the most remote tubes of the draining-distributing system is as high as 30 to 50 percent.

This disadvantage results in the gravel beds becoming displaced during a washing operation, as well as in general mixing of the beds of the filtering body, which affects the capacity of the filter and impairs the treatment quality.

In practice, a filter of the last-described kind is to be made inoperative every 5 of 6 years to have its filtering body replaced. The work involved is labour-consuming and calls for a great amount of purely manual labour.

It is an object of the present invention to step up the reliability of the performance of a filter for treatment of natural and waste water, owing to displacement and mixing of the beds of the granular filtering body at washing being precluded and formation of unwashable zones being prevented.

This object is attained in a filter for treatment of natural and waste water, comprising a housing accommodating therein a granular filtering body, a draining-distributing system arranged within the lowermost bed of the filtering body and communicating with a charging duct, and a system of ducts mounted in the housing above the filtering body and communicating with a collecting-distributing duct, in which filter, in accordance with the invention, the charging duct is provided with a device for positive distribution of water over the length thereof.

This novel feature levels out the water pressure longitudinally of the charging duct and, consequently, ensures uniform delivery of the water into the tubes of the draining-distributing system and, hence, over the surface area of the filtering body. As a result of the uniform distribution of the water over the surface area of the filtering body, displacement and mixing of the gravel beds is precluded, and formation of unwashable zones in the filtering body substantially prevented.

The above novel feature has enabled to step up the operational and sanitary-hygienic characteristics of the performance of the filter. Owing to the now created possibility of increasing the filtering rate by 10 to 12 percent without impairing the quality of the treated water, of cutting down the total washing time and the consumption of the washing water, the performance of the filter has become significantly more economical.

It is expedient that the said device for positive distribution of the washing water should include a perforated pipe accommodated within the charging duct.

The perforations enhance the uniformity of the admission of the washing water from the pipe into the charging duct throughout the length of the latter. The presence of the water cushion formed within the charging duct precludes delivery of this water into the tubes of the draining-distributing system in separate jets.

It is further expedient that the perforated pipe should be arranged above the draining-distributing system.

In this way the jet-like character of the delivery of water from the said perforated pipe into the charging duct would not affect in any noticeable degree the uniformity of the delivery of the water into the draining-distributing system.

Alternatively, it may be expedient that the device for positive distribution of the washing water should be in the form of a pipe arranged outside the charging duct and running therealong, this pipe communicating with the charging duct via a series of nozzles uniformly spaced longitudinally of the charging duct.

The last-mentioned structure of the device enables to cut down the amount of concrete-laying work at erection of the filter, and also makes the said device for positive distribution of water more accessible.

It may be also found expedient that the said device for positive distribution of the washing water should include a chamber adjoining the charging duct throughout the length thereof and communicating therewith through a plurality of perforations made through their common wall.

The last-mentioned structure of the device is the most practical when the filter is assembled from pre-fabricated reinforced-concrete modules.

The present invention will be further described with reference being made to the appended drawings, wherein.

Figure 1:
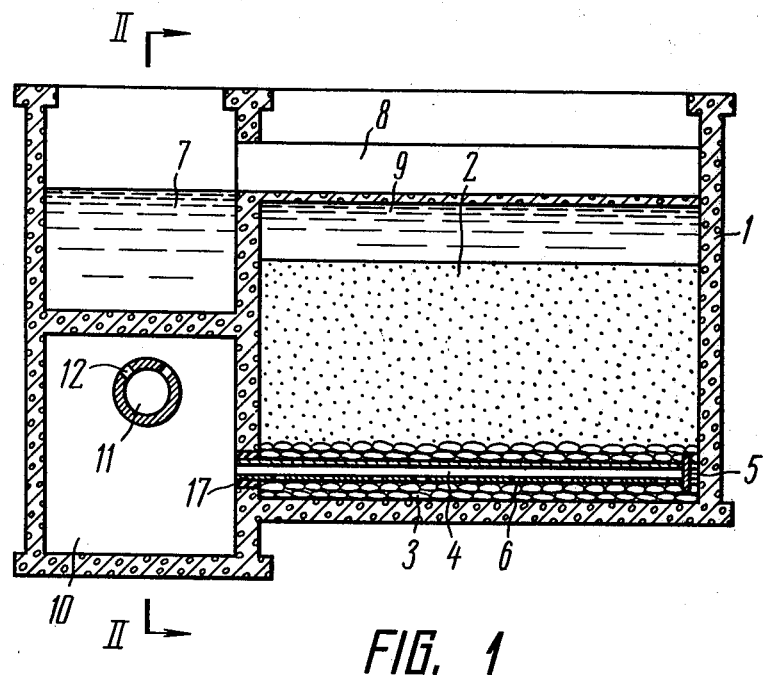
FIG. 1 is a sectional view of a filter constructed in accordance with the present invention, with the device for positive distribution of water in the form of a perforated pipe.

In the drawings, the filter for treatment of natural and waste water comprises a housing 1 (FIG. 1) accommodating therein a granular filtering body including a bed 2 of a granular fraction with a relatively fine grain size, and a lower gravel bed 3 wherein the granulometry gradually decreases in the upward direction. A draining-distributing system is accommodated in the lower bed 3 of the filtering body and includes tubes 4 with plugs 5 in their ends. Each tube 4 has perforations 6.

The filter further comprises a collecting-distributing duct 7 communicating with a system of troughs 8 arranged within the layer 9 of water forming in operation above the filtering body. There is also a charging or delivery duct 10 which in the presently described embodiment of the invention is rectangular in cross-section and communicates with the tubes 4 of the draining-distributing system. Arranged within the charging duct 10 is the device for positive distribution of the washing water including a pipe 11 with perforations 12. The pipe 11 is arranged above the tubes 4 of the draining-distributing system.

Figure 2:
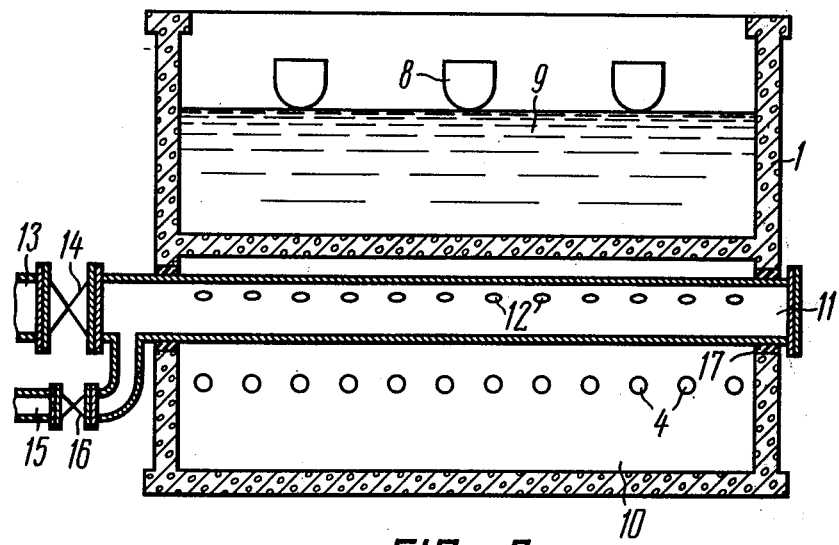
FIG. 2 is a sectional view taken on line II—II of FIG. 1.

The device for positive distribution of the washing water communicates with the washing water supply mains 13 (FIG. 2) incorporating a valve 14, and with a pipeline 15 having a valve 16 mounted therein.

Seals 17 (FIGS. 1 and 2) are provided in areas where the tubes 4 of the draining-distributing system and the pipe 11 pass through the walls of the housing 1, to provide for water-tightness of the latter.

Figure 3:
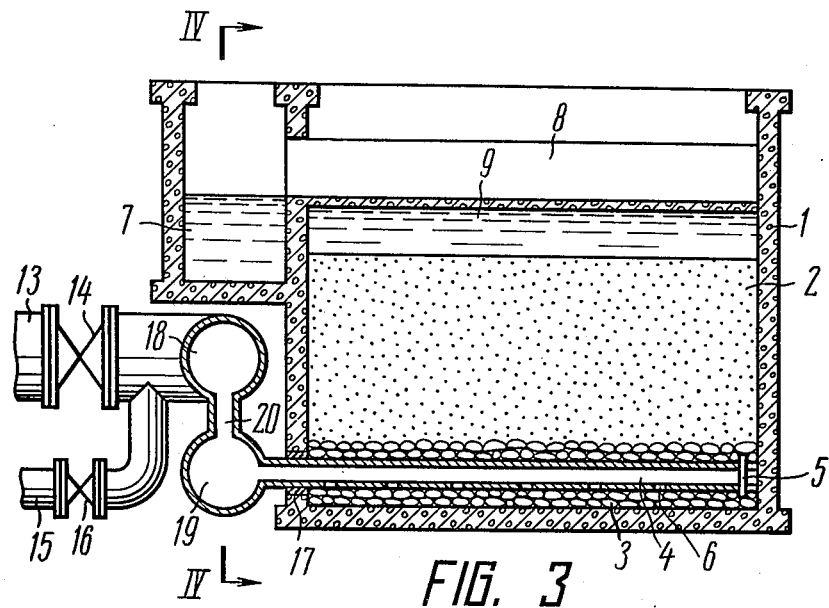
FIG. 3 is a sectional view of the filter with the device for positive distribution of water in the form of a pipe running outside the charging duct, longitudinally thereof, in accordance with an embodiment of the invention.
Figure 4:
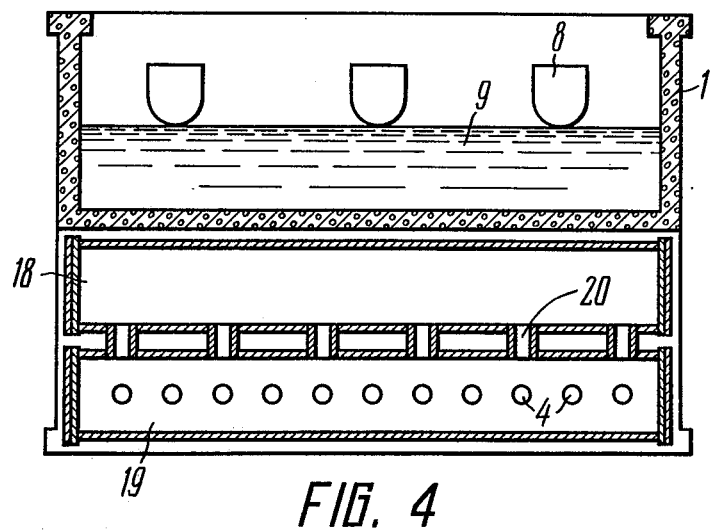
FIG. 4 is a sectional view taken on line IV—IV of FIG. 1.

The device of FIGS. 3 and 4 for positive distribution of the washing water includes a pipe 18 running along the charging duct 19 which is also a pipe. The pipe 18 is situated outside the charging duct 19 and communicates therewith via a series of connection nozzles 20 uniformly spaced longitudinally of the duct 19.

Figure 5:
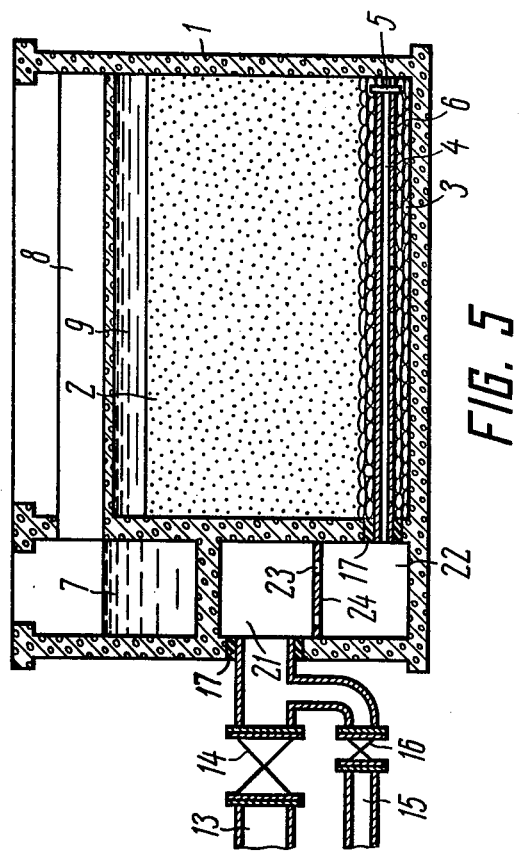
FIG. 5 is a sectional view of the filter with the device for positive distribution of water in the form of a chamber adjoining the charging duct, in accordance with another embodiment of the invention.

FIG. 5 of the appended drawings illustrates yet another embodiment of the device for positive distribution of the washing water, including a chamber 21 adjoining the charging duct 22 which can be of a rectangular cross-section, along the entire length of this charging duct 22, and communicating therewith through perforations 23 made through their common wall 24.

The herein disclosed filter operates, as follows.

In the filtering mode of operation water to be treated is supplied into the collecting-distributing duct 7 wherefrom it is directed via the system of the troughs 8 into the granular bed 2 with the finer grain size of the filtering body and then into the lower bed 3. While passing through the filtering body, the water is clarified and finds its way through the perforations 6 into the tubes 4 of the draining-distributing system, wherefrom it flows via the charging or delivery duct 10 (FIG. 1) and the pipe 11 of the device for positive distribution of water, or else via the charging duct 19 (FIG. 3) and the pipe 18, or else via the charging duct 22 (FIG. 5) and the chamber 21, into the pipeline 15 wherein the valve 16 is open, wherefrom the water is directed into a clear water tank or reservoir (not shown). During the filtering operation the valve 14 in the washing water supply line 13 is closed.

In the washing mode of operation, washing water is supplied from the washing water line 13, wherein the valve 14 is now open, into the pipe 11 (FIG. 1) and therefrom into the charging duct 10, or else into the pipe 18 (FIG. 3) and therefrom into the charging duct 19, or else into the chamber 21 (FIG. 5) and therefrom into the charging duct 22.

Owing to the positive distribution of the washing water throughout the length of the charging duct, the water pressure therein is levelled out throughout the length of the duct, whereby the washing water is uniformly supplied into the tubes 4 of the draining-distributing system. In this way displacement and mixing of the beds of the filtering body is substantially precluded, the reliability of the performance of the filter is enhanced, the operational and economic characteristics of its performance are improved.

From the perforations 6 of the tubes 4 of the draining-distributing system the washing water flows into the lower bed 3 of the filtering body and uniformly propagates therethrough into the bed 2 with the finer grain. This bed 2 with the finer grain has its particles suspended in the ascending water flow, and the dirt and impurities retained on the surface of the grains of the filtering body are washed away.

The washing water with the impurities carried thereby is collected by the system of the troughs 8 wherefrom it flows into the collecting-distributing duct 7 and then is directed into a sewage system.

In the washing mode of operation the valve 16 in the pipe 15 is closed.

It is thus apparent that with the structure of the invention, the filter includes a housing 1 accommodating in its interior a quantity of granular material which includes an upper portion 2 made up of filtering bodies which are finer than the lower filtering bodies 3 situated at the lower portion of the quantity of granular material accommodated in the housing 1. This housing 1 is in plan of a rectangular configuration and also accommodated in its interior at least sligtly above a bottom horizontal wall of the housing the plurality of tubes 4 each of which extends longitudinally substantially completely across the entire interior of the housing with the several tubes 4 being parallel to each other and uniformly distributed in the housing 1 in a plane substantially parallel to the bottom wall thereof, each of the tubes 4 having one end which is closed and an opposite end which is open, while also being formed only at a lower portion of each tube 4 with the perforations 6. The upper part of the housing 1 has the means 7, 8 for supplying water to be filtered to the interior of the housing 1 when the filter is in a filtering mode and for receiving wash water from the quantity of granular material when the filter is in a backwashing mode. All of the tubes 4 communicate at their open ends with a common duct means which extends perpendicularly across all of the tubes 4 and which extends to an elevation which is both lower and higher than the elevation of the tubes 4, this duct means being the duct 10 in FIGS. 1 and 2, the duct 19 in FIGS. 3 and 4, and the duct 22 in FIG. 5. A conduit means extends parallel to the duct means along the entire length thereof and is situated at an elevation higher than the tubes 4, this conduit means communicating with the duct means for receiving filtered water therefrom when the filter operates in the filtering mode and for supplying wash water thereto when the filter operates in the backwashing mode. This conduit means is formed by the pipe 11 in FIGS. 1 and 2 where it will be seen that the pipe 11 is situated in the interior of the duct 10 with the pipe 11 having the perforations 12 only in an upper portion of the pipe 11 so that when the embodiment of FIGS. 1 and 2 operates in the backwashing mode the wash water discharges from the conduit means 11 through the perforations 12 thereof in an upward direction to be sprayed out of the conduit means 11 while falling down to the bottom of the duct means 10 in which the wash water initially collects at an elevation lower than the tubes 4, this wash water then rising up to the elevation of the tubes 4 and entering into the latter so as to flow from the interior of the several tubes 4 downwardly through the perforations 6 thereof and then upwardly through the quantity of granular material 2, 3 in order to provide for backwashing thereof. In the embodiment of FIGS. 3 and 4, the conduit means is formed by the pipe 18 which communicates through the nozzles 20 with the interior of the duct means 19 in which the washing water also will initially collect at the lower portion of the duct means 19 while rising up to the elevation of the tubes 4 in order to enter into the latter and then provide the backwashing operation as set forth above. In the embodiment of FIG. 5, the conduit means 21 is also situated at an elevation higher than the tubes 4, communicating with the duct means 22 through the perforations 23 in the wall 24 which is common to and separates the duct means 22 from the conduit means 21. Thus it is clear that with the embodiment of FIG. 5 also the washing water will initially collect at the bottom part of the duct means 22, initially rising up in the duct means 22 to reach the elevation of the tubes 4, and then entering into the latter and flowing out through the lower perforations 6 thereof to carry out the backwashing operation as set forth above.

The housing 1 includes the illustrated horizontal bottom wall and an upright wall structure extending upwardly from the bottom wall to define the hollow interior portion of the housing 1 which accommodates the quantity of granular material 2, 3. This upright wall structure includes a pair of opposed upright walls shown in section in FIGS. 1, 3, and 5, the several tubes 4 extending through one of these opposed upright walls in a fluid-tight manner and terminating with their closed ends adjacent to the other of the opposed upright walls, the duct means 10, 19, or 22 communicating with the open ends of the tubes 4 adjacent to the above one upright wall of the housing 1.

What is claimed is:

1. In a filter, a housing having a horizontal bottom wall and an upright wall structure extending upwardly from said bottom wall and defining therewith a hollow interior portion of said housing, a quantity of granular material situated in said hollow interior portion of said housing and extending upwardly along said hollow interior portion from said bottom wall of said housing and along said upright wall structure thereof, means situated at an upper portion of said housing for supplying to said quantity of granular material liquid which is to be filtered when the filter is in a filtering mode and for receiving from the quantity of granular material wash water when the filter is in a backwashing mode, a plurality of horizontal tubes situated in said hollow interior portion of said housing and formed in the hollow interior portion of said housing with perforations through which filtered water flows to the interior of said tubes in the filtering mode and through which wash water is supplied to the granular material from said tubes in the backwashing mode, said upright wall structure including a pair of opposed walls through one of which said tubes extend in a fluid-tight manner with said tubes all terminating in closed ends adjacent to the other of said opposed walls while having open ends at the region of said one wall through which said tubes extend, all of said tubes being situated adjacent said bottom wall in a plane substantially parallel thereto while all of said tubes also are parallel to each other and are uniformly distributed in the hollow interior portion of said housing, elongated duct means extending perpendicularly across said tubes and formed by a portion of said housing which extends along said one wall of said housing at the side thereof opposite from the hollow interior of said housing in which said quantity of granular material is situated and communicating with all of said tubes through said open ends thereof for receiving filtered water from said tubes in the filtering mode and for delivering wash water thereto in the backwashing mode, and conduit means situated at an elevation higher than said tubes and extending along the interior of said duct means at an upper portion thereof parallel to said duct means along the entire length thereof while communicating with said duct means for receiving filtered water therefrom in the filtering mode and for delivering wash water thereto in the backwashing mode.

2. The combination of claim 1 and wherein said conduit means is in the form of a pipe which is formed only at an upper portion with perforations through which said pipe communicates with the interior of said duct means.

3. The combination of claim 1 and wherein said perforations of said tubes are situated only at lower portions of said tubes.

4. The combination of claim 1 and wherein said duct means extends downwardly from said open ends of said tubes to an elevation lower than said open ends of said tubes.

5. In a filter, a housing having a horizontal bottom wall and an upright wall structure extending upwardly from said bottom wall and defining therewith a hollow interior portion of said housing, a quantity of granular material situated in said hollow interior portion of said housing and extending upwardly along said hollow interior portion from said bottom wall of said housing and along said upright wall structure thereof, means situated at an upper portion of said housing for supplying to said quantity of granular material liquid which is to be filtered when the filter is in a filtering mode and for receiving from the quantity of granular material wash water when the filter is in a backwashing mode, a plurality of horizontal tubes situated in said hollow interior portion of said housing and formed in the hollow interior portion of said housing with perforations through which filtered water flows to the interior of said tubes in the filtering mode and through which wash water is supplied to the granular material from said tubes in the backwashing mode, said upright wall structure including a pair of opposed walls through one of which said tubes extend in a fluid-tight manner with said tubes all terminating in closed ends adjacent to the other of said opposed walls while having open ends at the region of said one wall through which said tubes extend, all of said tubes being situated adjacent said bottom wall in a plane substantially parallel thereto while all of said tubes also are parallel to each other and are uniformly distributed in the hollow interior portion of said housing, said housing having an elongated hollow portion situated at the side of said one wall opposite from the hollow interior portion of said housing which accommodates the granular material, and said elongated hollow portion of said housing carrying in its interior a horizontal partition dividing said hollow portion of said housing into upper and lower chambers separated from each other by said partition, said partition being formed with perforations through which said chambers communicate with each other, elongated duct means defined by said lower chamber extending perpendicularly across said tubes adjacent said one wall of said housing and communicating with all of said tubes through said open ends thereof for receiving filtered water from said tubes in the filtering mode and for delivering wash water thereto in the backwashing mode, and conduit means defined by said upper chamber situated at an elevation higher than said tubes and extending parallel to said duct means along the entire length thereof while communicating with said duct means for receiving filtered water therefrom in the filtering mode and for delivering wash water thereto in the backwashing mode.

6. The combination of claim 5 and wherein said perforations of said tubes are situated only at lower portions of said tubes.

* * * * *